(12) United States Patent
Gwon

(10) Patent No.: US 10,066,701 B2
(45) Date of Patent: Sep. 4, 2018

(54) MULTI-SPEED TRANSMISSION

(71) Applicant: Hyundai Motor Company, Seoul (KR)

(72) Inventor: Yeo Hyeon Gwon, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 316 days.

(21) Appl. No.: 14/954,598

(22) Filed: Nov. 30, 2015

(65) Prior Publication Data
US 2016/0319923 A1    Nov. 3, 2016

(30) Foreign Application Priority Data

Apr. 29, 2015 (KR) .................. 10-2015-0060563

(51) Int. Cl.
*F16H 3/08* (2006.01)
*F16H 3/00* (2006.01)
*F16H 3/093* (2006.01)

(52) U.S. Cl.
CPC ..... *F16H 3/006* (2013.01); *F16H 2003/0807* (2013.01); *F16H 2003/0822* (2013.01); *F16H 2003/0931* (2013.01); *F16H 2200/006* (2013.01); *F16H 2200/0069* (2013.01)

(58) Field of Classification Search
CPC ........... F16H 37/021; F16H 2003/0931; F16H 2003/007; F16H 2003/008
USPC .................................. 74/330, 331, 333, 340
See application file for complete search history.

(56) References Cited

U.S. PATENT DOCUMENTS

| 4,924,729 A * | 5/1990 | Sherman .................. F16H 3/54 475/207 |
| 5,554,079 A * | 9/1996 | Seo .......................... F16H 3/663 475/207 |
| 6,893,373 B2 * | 5/2005 | Kawamoto ............. F16H 3/666 475/302 |
| 8,323,142 B2 | 12/2012 | Masumoto |
| 8,561,493 B2 * | 10/2013 | Hoffmann ............. F16H 37/046 74/330 |
| 2010/0257963 A1 | 10/2010 | Rieger et al. |
| 2014/0371026 A1 | 12/2014 | Kim |

(Continued)

FOREIGN PATENT DOCUMENTS

| JP | 2012-2258 A | 1/2012 |
| KR | 10-2008-0033790 A | 4/2008 |
| KR | 10-2013-0077146 A | 7/2013 |

(Continued)

*Primary Examiner* — Ha Dinh Ho
(74) *Attorney, Agent, or Firm* — Morgan, Lewis & Bockius LLP

(57) ABSTRACT

A multi-speed transmission may include a first input shaft rotatable, a second input shaft rotatable coaxially with respect to the first input shaft, first clutch and second clutch respectively transmitting power from a driving source to the first and second input shafts, first output shaft and second output shaft parallel to the first and second input shafts, a plurality of odd-numbered gear-change gear trains provided between the first input shaft and the first output shaft and between the first input shaft and the second output shaft, a plurality of even-numbered gear-change gear trains provided between the second input shaft and the first output shaft and between the second input shaft and the second output shaft, and a reverse gear device installed in at least any one of the first and second output shafts, wherein the reverse gear device is configured as a planetary gear set.

19 Claims, 2 Drawing Sheets

(56) References Cited

U.S. PATENT DOCUMENTS

2015/0167787 A1\* 6/2015 Park .................... F16H 3/006
                                                                     74/330
2015/0285340 A1    10/2015  Kim et al.

FOREIGN PATENT DOCUMENTS

| KR | 10-1305730 B1 | 9/2013 |
|----|---------------|--------|
| KR | 10-1334508 B1 | 11/2013 |
| KR | 10-1417667 B1 | 7/2014 |
| KR | 10-1470196 B1 | 12/2014 |

\* cited by examiner

MULTI-SPEED TRANSMISSION

CROSS-REFERENCE TO RELATED APPLICATION

The present application is based on and claims the benefit of priority to Korean Patent Application No. 10-2015-0060563, filed on Apr. 29, 2015, the entire contents of which is incorporated herein for all purposes by this reference.

FIELD OF THE INVENTION

The present disclosure relates to a multi-speed transmission and, more particularly, to a multi-speed transmission capable of effectively realizing multiple speeds such as eight to eleven speeds, while minimizing components, thereby significantly enhancing fuel efficiency and shift quality to increase market competitiveness.

BACKGROUND

Research and development of vehicle transmissions have focused on novel vehicle transmissions aimed at increasing fuel efficiency of automatic transmissions.

Among transmissions, double clutch transmissions (DCTs) having two clutches, respectively corresponding to odd-numbered gear sets and even-numbered gear sets, to change speeds rapidly, have been commonly used.

The DCTs have efficiency of manual transmissions and convenience of automatic transmissions.

Seven-speed transmissions have been the mainstream of DCTs, and in recent years, multi-speed transmissions able to support eight to eleven speeds to further enhance fuel efficiency and shift quality have actively been researched and developed.

However, as multi-speed transmissions have multiple speeds, an overall length of a clutch transmission is lengthened by the number of gears increased according to the multiple shifts, increasing a layout and a possibility of causing interference with a peripheral component, which results in a degradation of mountability of the multi-speed transmissions mounted in a limited space of a vehicle.

The information disclosed in this Background of the Invention section is only for enhancement of understanding of the general background of the invention and should not be taken as an acknowledgement or any form of suggestion that this information forms the prior art already known to a person skilled in the art.

SUMMARY

Various aspects of the present invention are directed to providing a multi-speed transmission capable of realizing a compact layout by reducing an overall length and effectively realizing multiple speeds such as eight to eleven speeds, significantly enhancing fuel efficiency and shift quality to thus increase market competitiveness.

According to an exemplary embodiment of the present disclosure, a multi-speed transmission includes: a first input shaft installed to be rotatable; a second input shaft installed to be rotatable coaxially with respect to the first input shaft; first and second clutches respectively transmitting power from a driving source to the first and second input shafts; first and second output shafts installed to be parallel to the first and second input shafts; a plurality of odd-numbered gear-change gear trains provided between the first input shaft and the first output shaft and between the first input shaft and the second output shaft; a plurality of even-numbered gear-change gear trains provided between the second input shaft and the first output shaft and between the second input shaft and the second output shaft; and a reverse gear device installed in at least any one of the first and second output shafts, wherein the reverse gear device is configured as a planetary gear set.

The reverse gear device may include a sun gear rotating in the same direction together with an adjacent driven gear, at least one planetary gear engaged with the sun gear, a carrier configured to support the at least one planetary gear, and a ring gear engaged with the at least one planetary gear, wherein the carrier may be fixed to a transmission housing, and the ring gear may be configured to be coupled to or released from the output shaft in which the reverse gear device is installed, by a synchronizer.

The plurality of odd-numbered gear-change gear trains may each include an odd-numbered speed driving gear provided in the first input shaft and an odd-numbered speed driven gear provided in the first output shaft or the second output shaft and engaged with the odd-numbered speed driving gear, and the plurality of even-numbered gear-change gear trains may each include an even-numbered speed driving gear installed in the second input shaft and an even-numbered speed driven gear installed in the first output shaft or the second output shaft and engaged with the even-numbered speed driving gear.

The multi-speed transmission may further include: a power transmission unit configured to transmit power received from the first input shaft to the first output shaft or the second output shaft through the second input shaft or transmit power received from the second input shaft to the first output shaft or the second output shaft through the first input shaft.

The power transmission unit may include a power transmission synchronizer installed between the odd-numbered speed driven gear and the even-numbered speed driven gear disposed to be adjacent to each other on the first output shaft or the second output shaft, and the power transmission synchronizer may be configured to selectively couple the odd-numbered speed driven gear and the even-numbered speed driven gear disposed to be adjacent to each other.

The plurality of odd-numbered gear-change gear trains may include a third gear-change gear train, a fifth gear-change gear train, and a seventh gear-change gear train, and the plurality of even-numbered gear-change gear trains may include a second gear-change gear train, a fourth gear-change gear train, a sixth gear-change gear train, and an eighth gear-change gear train.

The third gear-change gear train may have a third speed driving gear installed in the first input shaft and a third speed driven gear engaged with the third speed driving gear, the fifth gear-change gear train may have a fifth speed driving gear installed in the first input shaft and a fifth speed driven gear engaged with the fifth speed driving gear, the seventh gear-change gear train may have a seventh speed driving gear installed in the first input shaft and a seventh speed driven gear engaged with the seventh speed driving gear, and the third speed driven gear and the fifth speed driven gear may be installed in the first output shaft and the seventh speed driven gear may be installed in the second output shaft.

The second gear-change gear train may have a second speed driving gear installed in the second input shaft and a second speed driven gear engaged with the second speed driving gear, the fourth gear-change gear train may have a fourth speed driving gear installed in the second input shaft and a fourth speed driven gear engaged with the fourth speed driving gear, the sixth gear-change gear train may have a sixth speed driving gear installed in the second input shaft and a sixth speed driven gear engaged with the sixth speed driving gear, the second speed driven gear and the sixth speed driven gear may be installed in the second output shaft and the fourth speed driven gear may be installed in the first output shaft, and the eighth gear-change gear train may include the eighth speed driven gear installed in the first output shaft, and the eighth speed driven gear may be disposed to be engaged with the sixth speed driving gear.

A second/seventh speed synchronizer may be installed between the second speed driven gear and the seventh speed driven gear to selectively couple the second speed driven gear and the seventh speed driven gear to the second output shaft.

The reverse gear device may be disposed between the second speed driven gear and the sixth speed driven gear, the sun gear of the reverse gear device may be connected to rotate in the same direction together with the second speed driven gear, and a sixth/Rth speed synchronizer may be installed between the sixth speed driven gear and the reverse gear device to selectively couple the sixth speed driven gear and the ring gear of the reverse gear device to the second output shaft.

A third/fifth speed synchronizer may be installed between the third speed driven gear and the fifth speed driven gear to selectively couple the third speed driven gear and the fifth speed driven gear to the first output shaft.

A fourth/eighth speed synchronizer may be installed between the fourth speed driven gear and the eighth speed driven gear to selectively couple the fourth speed driven gear and the eighth speed driven gear to the first output shaft.

The power transmission synchronizer may be installed between the third speed driven gear and the fourth speed driven gear, and the power transmission synchronizer may be configured to selectively couple the fourth speed driven gear and the third speed driven gear.

The plurality of odd-numbered gear-change gear trains may include a third gear-change gear train, a fifth gear-change gear train, a seventh gear-change gear train, and a ninth gear-change gear train, and the plurality of even-numbered gear-change gear trains may include a second gear-change gear train, a fourth gear-change gear train, a sixth gear-change gear train, and an eighth gear-change gear train.

The third gear-change gear train may have a third speed driving gear installed in the first input shaft and a third speed driven gear engaged with the third speed driving gear, the fifth gear-change gear train may have a fifth speed driving gear installed in the first input shaft and a fifth speed driven gear engaged with the fifth speed driving gear, the seventh gear-change gear train may have a seventh speed driving gear installed in the first input shaft and a seventh speed driven gear engaged with the seventh speed driving gear, the third speed driven gear may be installed in the first output shaft and the fifth speed driven gear and the seventh speed driven gear may be installed in the second output shaft, and the ninth gear-change gear train may have a ninth speed driven gear installed in the first output shaft and the ninth speed driven gear may be disposed to be engaged with the seventh speed driving gear.

The second gear-change gear train may have a second speed driving gear installed in the second input shaft and a second speed driven gear engaged with the second speed driving gear, the fourth gear-change gear train may have a fourth speed driving gear installed in the second input shaft and a fourth speed driven gear engaged with the fourth speed driving gear, the sixth gear-change gear train may have a sixth speed driving gear installed in the second input shaft and a sixth speed driven gear engaged with the sixth speed driving gear, the second speed driven gear and the sixth speed driven gear may be installed in the second output shaft and the fourth speed driven gear may be installed in the first output shaft, and the eighth gear-change gear train may include an eighth speed driven gear installed in the first output shaft, and the eighth speed driven gear may be disposed to be engaged with the sixth speed driving gear.

A second speed synchronizer may be installed at one side of the second speed driven gear to selectively couple the second speed driven gear to the second output shaft.

The reverse gear device may be disposed between the second speed driven gear and the sixth speed driven gear, the sun gear of the reverse gear device may be connected to rotate in the same direction together with the second speed driven gear, and a sixth/Rth speed synchronizer may be installed between the sixth speed driven gear and the reverse gear device to selectively couple the sixth speed driven gear and the ring gear of the reverse gear device to the second output shaft.

A third-ninth speed synchronizer may be installed between the third speed driven gear and the ninth speed driven gear to selectively couple the third speed driven gear and the ninth speed driven gear to the first output shaft.

A fourth/eighth speed synchronizer may be installed between the fourth speed driven gear and the eighth speed driven gear to selectively couple the fourth speed driven gear and the eighth speed driven gear to the first output shaft.

A fifth-seventh speed synchronizer may be installed between the fifth speed driven gear and the seventh speed driven gear to selectively couple the fifth speed driven gear and the seventh speed driven gear to the second output shaft.

The power transmission synchronizer may be installed between the third speed driven gear and the fourth speed driven gear, and the power transmission synchronizer may be configured to selectively couple the fourth speed driven gear and the third speed driven gear.

According to another exemplary embodiment of the present disclosure, a multi-speed transmission includes: first and second input shafts installed to be coaxially rotatable with respect to each other; first and second clutches respectively transmitting power from a driving source to the first and second input shafts; and first and second output shafts installed to be parallel to the first and second input shafts, wherein a third speed driving gear, a fifth speed driving gear, and a seventh speed driving gear are installed in the first input shaft, a second speed driving gear, a fourth speed driving gear, and a sixth speed driving gear are installed in the second input shaft, a third speed driven gear engaged with the third speed driving gear, a fifth speed driven gear engaged with the fifth speed driving gear, a fourth speed driven gear engaged with the fourth speed driving gear, and an eighth speed driven gear engaged with the sixth speed driving gear are installed in the first output shaft, a second speed driven gear engaged with the second speed driving gear, a sixth speed driven gear engaged with the sixth speed driving gear, and a seventh speed driven gear engaged with the seventh speed driving gear are installed in the second output shaft, and a reverse gear device is installed between the second speed driven gear and the sixth speed driven gear and the reverse gear device is configured as a planetary gear set cooperatively operated with the second speed driving gear.

A power transmission synchronizer may be installed in any one of the first output shaft and the second output shaft, and the power transmission synchronizer may be configured to transmit power received from the first input shaft to the first output shaft and the second output shaft through the second input shaft or transmit power received from the second input shaft to the first output shaft and the second output shaft through the first input shaft.

According to another exemplary embodiment of the present disclosure, a multi-speed transmission includes: first and second input shafts installed to be coaxially rotatable with respect to each other; first and second clutches respectively transmitting power from a driving source to the first and second input shafts; and first and second output shafts installed to be parallel to the first and second input shafts, wherein a third speed driving gear, a fifth speed driving gear, and a seventh speed driving gear are installed in the first input shaft, a second speed driving gear, a fourth speed driving gear, and a sixth speed driving gear are installed in the second input shaft, a third speed driven gear engaged with the third speed driving gear, a ninth speed driven gear engaged with the seventh speed driving gear, a fourth speed driven gear engaged with the fourth speed driving gear, and an eighth speed driven gear engaged with the sixth speed driving gear are installed in the first output shaft, a second speed driven gear engaged with the second speed driving gear, a fifth speed driven gear engaged with the fifth speed driving gear, a sixth speed driven gear engaged with the sixth speed driving gear, and a seventh speed driven gear engaged with the seventh speed driving gear are installed in the second output shaft, and a reverse gear device is installed between the second speed driving gear and the sixth speed driven gear and the reverse gear device may be configured as a planetary gear set cooperatively operated with the second speed driving gear.

A power transmission synchronizer may be installed in any one of the first output shaft and the second output shaft, and the power transmission synchronizer may be configured to transmit power received from the first input shaft to the first output shaft and the second output shaft through the second input shaft or transmit power received from the second input shaft to the first output shaft and the second output shaft through the first input shaft.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
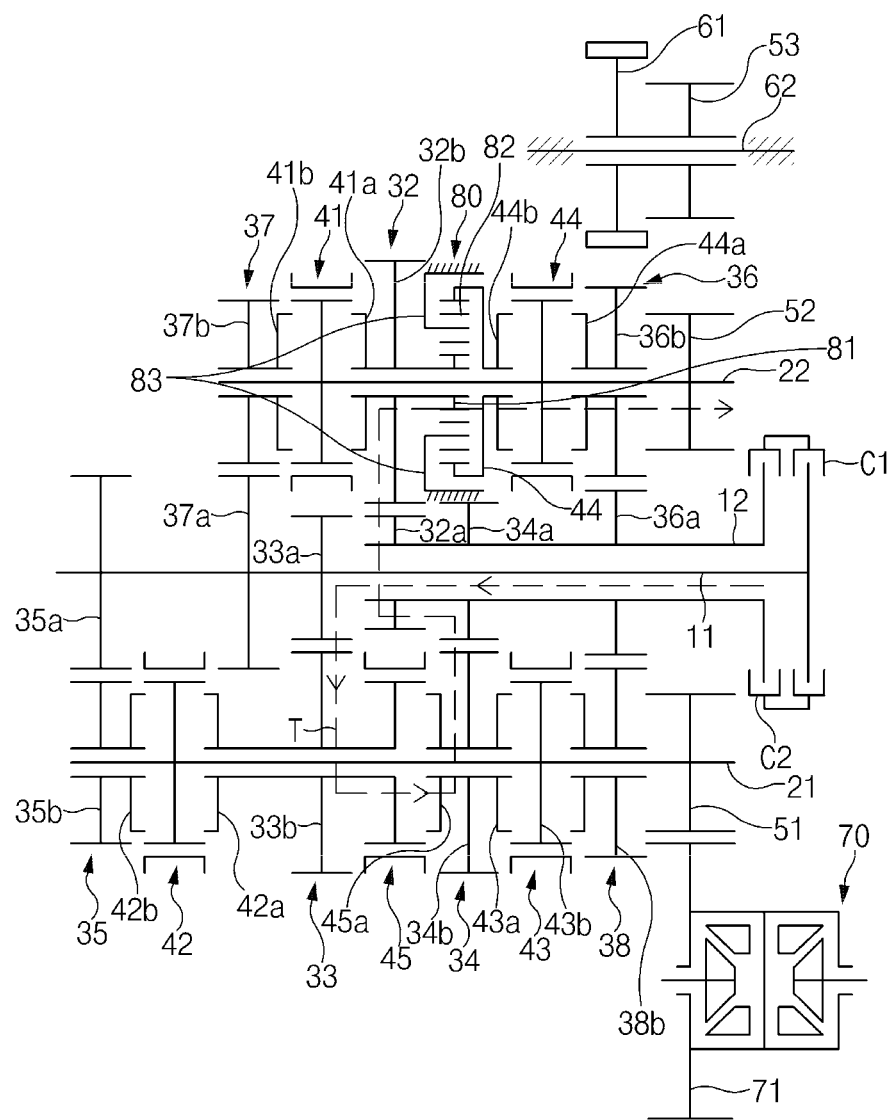
FIG. 1 is a view illustrating a configuration of a multi-speed transmission according to an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the exemplary embodiment of the present disclosure will be described in detail with reference to the accompanying drawings. For reference, dimensions of elements or thicknesses of lines illustrated in the drawings referred to describe the present disclosure may be exaggerated for the convenience of understanding. Also, the terms used henceforth have been defined in consideration of the functions of the present invention, and may be altered according to the intent of a user or operator, or conventional practice.

Therefore, the terms should be defined on the basis of the entire content of this specification.

FIG. 1 is a view illustrating a configuration of a multi-speed transmission according to an exemplary embodiment of the present disclosure.

Referring to FIG. 1, a multi-speed transmission includes a rotatably installed first input shaft 11, a second input shaft 12 installed to be rotatable coaxially with respect to the first input shaft 11, first and second clutches C1 and C2 respectively transmitting power from a driving source to the first and second input shafts 11 and 12, and first and second output shafts 21 and 22 respectively installed to be parallel to the first and second input shafts 11 and 12.

The first input shaft 11 extends in a length direction and is rotatably installed within a transmission housing.

The second input shaft 12 is configured as a hollow shaft with a hollow portion formed therein, the first input shaft 11 is disposed in the hollow portion of the second input shaft 12, and the second input shaft 12 is installed to freely rotate with respect to the first input shaft 11.

The first clutch C1 is configured to transmit power transferred from the driving source such as an engine or an electric motor to the first input shaft 11.

The second clutch C2 is configured to transmit power transferred from the driving source such as an engine or an electric motor to the second input shaft 12.

The first output shaft 21 is disposed to be parallel to the first and second input shafts 11 and 12, and a first final gear 51 is fixed to one end of the first output shaft 21.

The second output shaft 22 is disposed to be parallel to the first and second input shafts 11 and 12, and a second final gear 52 is fixed to one end of the second output shaft 22.

The first final gear 51 of the first output shaft 21 and the second final gear 52 of the second output shaft 22 are engaged with a ring gear 71 of a differential gear device 70.

A parking shaft 62 is disposed to be parallel to the first output shaft 21 and the second output shaft 22, a parking gear 61 is fixed to a portion in the middle of the parking shaft 62, and a third final gear 53 is fixed to one end of the parking shaft 62. The third final gear 53 of the parking shaft 62 is engaged with the ring gear 71 of the differential gear device 70. In this manner, since the parking shaft 62 is disposed outside of the first and second output shafts 21 and 22, an overall length of the multi-speed transmission may be reduced to effective implement a very compact structure.

A plurality of odd-numbered gear-change gear trains 33, 35, and 37 are installed between the first input shaft 11 and the first output shaft 21 and between the first input shaft 11 and the second output shaft 22. The plurality of odd-numbered gear-change gear trains 33, 35, and 37 include a third gear-change gear train 33, a fifth gear-change gear train, and a seventh gear-change gear train and perform odd-numbered gear shifting, and are configured to perform odd-numbered gear shifting such as third speed, fifth speed, and seventh speed, gear shifting.

The odd-numbered gear-change gear trains 33, 35, and 37 have odd-numbered speed driving gears 33a, 35a, and 37a provided in the first input shaft 11 and odd-numbered speed driven gears 33b, 35b, and 37b provided in the first output shaft 21 or the second output shaft 22 and engaged with the odd-numbered speed driving gears 33a, 35a, and 37a.

The odd-numbered gear-change gear trains 33, 35, and 37 will be described individually.

The third gear-change gear train 33 has a third speed driving gear 33a installed in the first input shaft 11 and a third speed driven gear 33b engaged with the third speed driving gear 33a, and the third speed driven gear 33b is installed in the first output shaft 21. Thus, when power from the driving source is input to the first input shaft 11 due to coupling of the first clutch C1, the third speed driving gear 33a of the first input shaft 11 rotates and the third speed driven gear 33b cooperatively rotates according to the rotation of the third speed driving gear 33a, thus shifting to the third speed.

The fifth gear-change gear train 35 has a fifth speed driving gear 35a installed in the first input shaft 11 and a fifth speed driven gear 35b engaged with the fifth speed driving gear 35a, and the fifth speed driven gear 35b is installed in the first output shaft 21. Thus, when power from the driving source is input to the first input shaft 11 due to coupling of the first clutch C1, the fifth speed driving gear 35a of the first input shaft 11 rotates and the fifth speed driven gear 35b cooperatively rotates according to the rotation of the fifth speed driving gear 35a, thus shifting to the fifth speed.

The seventh gear-change gear train 37 has a seventh speed driving gear 37a installed in the first input shaft 11 and a seventh speed driven gear 37b engaged with the seventh speed driving gear 37a, and the seventh speed driven gear 37b is installed in the second output shaft 22. Thus, when power from the driving source is input to the first input shaft 11 due to coupling of the first clutch C1, the seventh speed driving gear 37a of the first input shaft 11 rotates and the seventh speed driven gear 37b cooperatively rotates according to the rotation of the seventh speed driving gear 37a, thus shifting to the seventh speed.

A plurality of even-numbered gear-change gear trains 32, 34, 36, and 38 is installed between the second input shaft 12 and the first output shaft 21 and between the second input shaft 12 and the second output shaft 22. The even-numbered gear-change gear trains 32, 34, 36, and 38 include a second gear-change gear train 32, a fourth gear-change gear train 34, a sixth gear-change gear train 36, and an eighth gear-change gear train 38, thus performing even-numbered gear shifting, such as second, fourth, sixth, and eighth speeds.

The even-numbered gear-change gear trains 32, 34, 36, and 38 include even-numbered speed driving gears 32a, 34a, and 36a installed in the second input shaft 12 and even-numbered speed driven gears 32b, 34b, 36b, and 38b installed in the first output shaft 21 or the second shaft 22 and engaged with the even-numbered speed driving gears 32a, 34a, and 36a.

The even-numbered gear-change gear trains 32, 34, 36, and 38 will be described individually.

The second gear-change gear train 32 has a second speed driving gear 32a installed in the second input shaft 12 and a second speed driven gear 32b engaged with the second speed driving gear 32a, and the second speed driven gear 32b is installed in the second output shaft 22. Thus, when power from the driving source is input to the second input shaft 12 due to coupling of the second clutch C2, the second speed driving gear 32a of the second input shaft 12 rotates and the second speed driven gear 32b cooperatively operates according to the rotation of the second speed driving gear 32a, thus shifting to the second speed.

The fourth gear-change gear train 34 has a fourth speed driving gear 34a installed in the second input shaft 12 and a fourth speed driven gear 34b engaged with the fourth speed driving gear 34a, and the fourth speed driven gear 34b is installed in the first output shaft 21. Thus, when power from the driving source is input to the second input shaft 12 due to coupling of the second clutch C2, the fourth speed driving gear 34a of the second input shaft 12 rotates and the fourth speed driven gear 34b cooperatively operates according to the rotation of the fourth speed driving gear 34a, thus shifting to the fourth speed.

The sixth gear-change gear train 36 has a sixth speed driving gear 36a installed in the second input shaft 12 and a sixth speed driven gear 36b engaged with the sixth speed driving gear 36a, and the sixth speed driven gear 36b is installed in the second output shaft 22. Thus, when power from the driving source is input to the second input shaft 12 due to coupling of the second clutch C2, the sixth speed driving gear 36a of the second input shaft 12 rotates and the sixth speed driven gear 36b cooperatively operates according to the rotation of the sixth speed driving gear 36a, thus shifting to the sixth speed.

The eighth gear-change gear train 38 has an eighth speed driven gear 38b installed in the first input shaft 21, and the eighth speed driven gear 38b is disposed at an appropriate position on the opposite side of the sixth speed driven gear 36b so as to be engaged with the sixth speed driving gear 36a of the sixth gear-change gear train 36. Thus, when power from the driving source is input to the second input shaft 12 due to coupling of the second clutch C2, the sixth speed driving gear 36a of the second input shaft 12 rotates and the eighth speed driven gear 38b cooperatively operates according to the rotation of the sixth speed driving gear 36a, thus shifting to the eighth speed.

In this manner, in the present disclosure, since the eighth speed driven gear 38b and the sixth speed driven gear 36b are engaged together with respect to the sixth speed driving gear 36a, sixth speed and eighth speed gear shifting are performed by the single sixth speed driving gear 36a, simplifying the components, whereby the compact layout may be effectively realized and the multiple speeds may be effectively performed.

In the present disclosure, a reverse gear device 80 is installed in at least one of the first and second output shafts 21 and 22. The reverse gear device 80 includes planetary gear sets 81, 82, 83, and 84 interlocked with the adjacent gear 32b.

The reverse gear device 80 includes a sun gear 81 rotating in the same direction together with any one driven gear 32b adjacent thereto, at least one planetary gear 82 engaged with the sun gear 81, a carrier 83 supporting the planetary gear 82, and a ring gear 84 engaged with the planetary gear 82.

According to an exemplary embodiment, the reverse gear device 80 is installed in the second output shaft 22, and in particular, the reverse gear device 80 is disposed between the second speed driven gear 32b and the sixth speed driven gear 36b. Since the sun gear 81 is installed in the second output shaft 22 and integrally connected to the second speed driven gear 32b installed in the second output shaft 22, the sun gear 81 rotates in the same direction as that of the second speed driven gear 32b cooperatively according to the rotation of the second speed driven gear 32b.

The carrier 83 is fixed to the transmission housing, or the like. A sixth/Rth speed synchronizer 44 is disposed between the reverse gear device 80 and the sixth gear-change gear train 36, and the ring gear 84 is coupled to or released from the second output shaft 22 by the sixth/Rth speed synchronizer 44.

An Rth speed gear shifting process by the reverse gear device 80 will be described.

When power is transmitted to the second input shaft 12 through the clutch C2, the second speed driving gear 32a of the second input shaft 12 rotates in the same direction as that of the second input shaft 12, the second speed driven gear 32b is rotated by the second speed driving gear 32a in a direction opposite to that of the second input shaft 12, and the sun gear 81 also rotates in a direction opposite to that of the second input shaft 12 according to the rotation of the second speed driven gear 32b. With the rotation of the sun gear 81, the planetary gear 82 rotates in a direction opposite to that of the sun gear 81 (that is, the planetary gear 82 rotates in the same direction as that of the second input shaft 12), and the ring gear 84 rotates in the same direction as that of the planetary gear 82 cooperatively according to the rotation of the planetary gear 82 (that is, the ring gear 84 rotates in the same direction as that of the second input shaft 12). Here, when the Rth speed coupling member 44a of the sixth/Rth speed synchronizer 44 couples the ring gear 84 to the second output shaft 22, the second output shaft 22 rotates in the same direction as that of the second input shaft 12 through the ring gear 84, and accordingly, the second final gear 52 of the second output shaft 22 reversely rotates the differential gear device 70, thus shifting to the Rth speed.

In this manner, in the present disclosure, since the reverse gear device 80 includes a planetary gear set, an idler gear may not be used unlike the related art multi-speed transmission, and thus, an overall length of the multi-speed transmission may be reduced, effectively realizing more compact layout.

Also, the synchronizers 41, 42, 43, 44, and 45 are installed between the aforementioned driven gears 32b, 33b, 34b, 35b, 36b, 37b, and 38b to selectively couple the driven gears 32b, 33b, 34b, 35b, 36b, 37b, and 38b to the first and second output shafts 21 and 22, thereby selectively performing gear shifting.

The synchronizers 41, 42, 43, 44, and 45 will be described in detail.

The second/seventh speed synchronizer 41 selectively coupling the second speed driven gear 32b and the seventh speed driven gear 37b to the second output shaft 22 is installed between the second speed driven gear 32b and the seventh speed driven gear 37b. The second/seventh speed synchronizer 41 has a second speed coupling member 41a selectively coupling the second speed driven gear 32b to the second output shaft 22 and a seventh speed coupling member 41b selectively coupling the seventh speed driven gear 37b to the second output shaft 22.

The third/fifth speed synchronizer 42 selectively coupling the third speed driven gear 33b and the fifth speed driven gear 35b to the first output shaft 21 is installed between the third speed driven gear 33b and the fifth speed driven gear 35b. The third/fifth speed synchronizer 42 has a third speed coupling member 42a selectively coupling the third speed driven gear 33b to the first output shaft 21 and a fifth speed coupling member 42b selectively coupling the fifth speed driven gear 35b to the first output shaft 21.

The fourth/eighth speed synchronizer 43 selectively coupling the fourth speed driven gear 34b and the eighth speed driven gear 38b to the first output shaft 21 is installed between the fourth speed driven gear 34b and the eighth speed driven gear 38b. The fourth/eighth speed synchronizer 43 has a fourth speed coupling member 43a selectively coupling the fourth speed driven gear 34b to the first output shaft 21 and an eighth speed coupling member 43b selectively coupling the eighth speed driven gear 38b to the first output shaft 21.

The sixth/Rth speed synchronizer 44 selectively coupling the sixth speed driven gear 36b and the ring gear 84 of the reverse gear device 80 to the second output shaft 22 is installed between the sixth speed driven gear 36b and the reverse gear device 80. The sixth/Rth speed synchronizer 44 has a sixth speed coupling member 44a selectively coupling the sixth speed driven gear 36b to the second output shaft 22 and an Rth speed coupling member 44b selectively coupling the ring gear 84 of the reverse gear device 80 to the second output shaft 22.

Meanwhile, the multi-speed transmission according to an exemplary embodiment of the present disclosure further includes a power transmission unit transmitting power received from the first input shaft 11 to the first output shaft 21 or the second output shaft 22 through the second input shaft 12 or transmitting power received from the second input shaft 12 to the first output shaft 21 or the second output shaft 22 through the first input shaft 11.

The power transmission unit includes the synchronizer 45 for power transmission (or a power transmission synchronizer 45) installed between any one odd-numbered speed driven gear 33b and any one even-numbered speed driven gear 34b disposed to be adjacent to each other on the first output shaft 21 or the second output shaft 22. The power transmission synchronizer 45 is configured to selectively couple an odd-numbered speed driven gear 33b and an even-numbered speed driven gear 34b adjacent to each other.

Thus, the power transmission synchronizer 45 may transmit power received from the first input shaft 11 to the even-numbered speed driven gear 34b adjacent thereto through the odd-numbered speed driven gear 33b or may transmit power transmitted from the second input shaft 12 to the odd-numbered speed driven gear 33b adjacent thereto through the even-numbered speed driven gear 34b.

Through the power transmission unit, the number of required components may be reduced, effectively realizing multiple speeds, while realizing a compact layout.

For example, as described above, in an exemplary embodiment of the present disclosure, a first gear-change gear train for shifting to the first speed is not additionally provided, but shifting to the first speed may be performed by the power transmission unit. That is, shifting to the first speed may be effectively performed through gear ratio combinations of the one or more odd-numbered gear-change gear trains and one or more even-numbered gear-change gear trains by transmitting power transmitted from the first input shaft 11 to the second output shaft 22 through the second input shat 12 by the power transmission unit.

According to an exemplary embodiment, the power transmission synchronizer 45 is installed between the third speed driven gear 33b and the fourth speed driven gear 34b and has a coupling member 45a for selectively coupling the fourth speed driven gear 34b and the third speed driven gear 33b.

Through this configuration, when the power transmission coupling member 45a of the power transmission synchronizer 45 is coupled to operate in a state in which turning force from the first input shaft 11 is transmitted to the third speed driven gear 33b of the third gear-change gear train 33, the fourth speed driven gear 34b and the third speed driven gear 33b are interlocked, the fourth speed driven gear 34b is rotated together with the third speed driven gear 33b in the same direction, the fourth speed driving gear 34a rotates cooperatively according to the rotation of the fourth speed driven gear 34b, and the second input shaft 12 is rotated by the fourth speed driving gear 34a. When any one driven gear 32b, 36b, or 37b provided in the second output shaft 22 is coupled by the synchronizers 41 and 44 according to the rotation of the second input shaft 12, first speed gear shifting may be performed. For example, referring to the direction T of the arrows in FIG. 1, as the second speed driven gear 32b is coupled to the second output shaft 22 by the second/seventh speed synchronizer 41, a gear ratio R3 of the third gear-change gear train 33, a gear ratio R4 of the fourth gear-change gear train 34, and a gear ratio R2 of the second gear-change gear train 32 are combined in the second output shaft 22, thus calculating a first speed gear ratio R1 corresponding to first speed gear shifting. That is, the first speed gear ratio R1 may be calculated by combining a gear ratio based on R1=(R3/R4)×R2.

Figure 2:
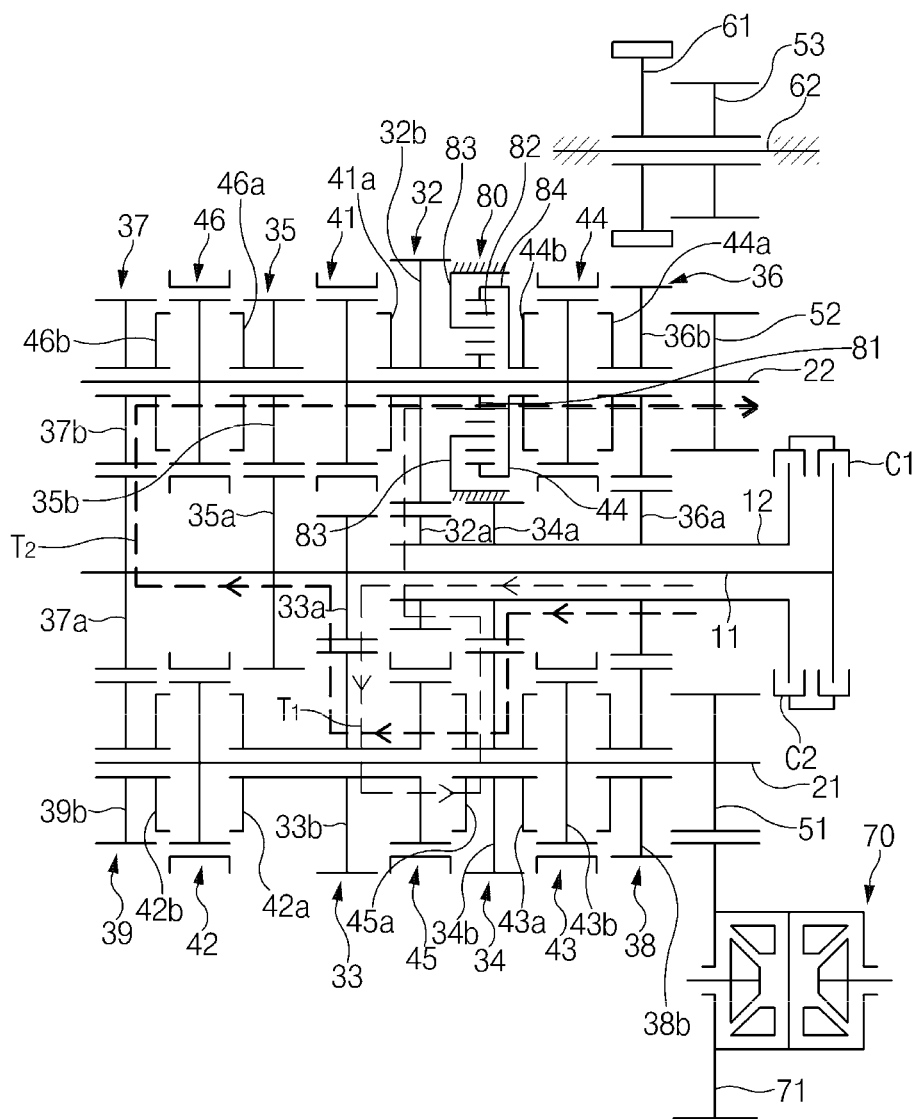
FIG. 2 is a view illustrating a configuration of a multi-speed transmission according to another exemplary embodiment of the present disclosure.

FIG. 2 is a view illustrating a configuration of a multi-speed transmission according to another exemplary embodiment of the present disclosure.

As illustrated in FIG. 2, the multi-speed transmission according to another exemplary embodiment of the present disclosure is configured to effectively realize first to tenth gear shifting.

A plurality of odd-numbered gear-change gear trains 33, 35, 37, and 39 are installed between the first input shaft 11 and the first output shaft 21 and between the first input shaft 11 and the second output shaft 22. The plurality of odd-numbered gear-change gear trains 33, 35, and 37 include a third gear-change gear train 33, a fifth gear-change gear train 35, a seventh gear-change gear train 37, and a ninth gear-change gear train, and are configured to perform odd-numbered gear shifting such as third speed, fifth speed, seventh speed, and ninth speed gear shifting.

Each of the odd-numbered gear-change gear trains 33, 35, and 37 include odd-numbered speed driving gears 33a, 35a, and 37a provided in the first input shaft 11, odd-numbered speed driven gears 33b, 35b, 37b, and 39b) provided in the first output shaft 21 or the second output shaft 22 and engaged with the odd-numbered speed driving gears 33a, 35a, and 37a.

The odd-numbered gear-change gear trains 33, 35, 37, and 39 will be described individually.

The third gear-change gear train 33 has the third speed driving gear 33a installed in the first input shaft 11 and the third speed driven gear 33b engaged with the third speed driving gear 33a. The third speed driven gear 33b is installed in the first output shaft 21. Thus, when power from a driving source is input to the first input shaft 11 according to coupling of the first clutch C1, the third speed driving gear 33a of the first input shaft 11 rotates, and the third speed driven gear 33b cooperatively operates according to the rotation of the third speed driving gear 33a, thus shifting to the third speed.

The fifth gear-change gear train 35 has the fifth speed driving gear 35a installed in the first input shaft 11 and the fifth speed driven gear 35b engaged with the fifth speed driving gear 35a. The fifth speed driven gear 35b is installed in the second output shaft 22. Thus, when power from the driving source is input to the first input shaft 11 according to coupling of the first clutch C1, the fifth speed driving gear 35a of the first input shaft 11 rotates, and the fifth speed driven gear 35b cooperatively operates according to the rotation of the fifth speed driving gear 35a, thus shifting to the fifth speed.

The seventh gear-change gear train 37 has the seventh speed driving gear 37a installed in the first input shaft 11 and the seventh speed driven gear 37b engaged with the seventh speed driving gear 37a. The seventh speed driven gear 37b is installed in the second output shaft 22. Thus, when power from the driving source is input to the first input shaft 11 according to coupling of the first clutch C1, the seventh speed driving gear 37a of the first input shaft 11 rotates, and the seventh speed driven gear 37b cooperatively operates according to the rotation of the seventh speed driving gear 37a, thus shifting to the seventh speed.

The ninth gear-change gear train 39 has the ninth speed driven gear 39b installed in the first output shaft 21. The ninth speed driven gear 39b is disposed in an appropriate position on the opposite side of the seventh speed power driven gear 37b so as to be engaged with the seventh speed driving gear 37a of the seventh gear-change gear train 37. Thus, when power from the driving source is input to the first input shaft 11 according to coupling of the first clutch C1, the seventh speed driving gear 37a of the first input shaft 11 rotates, and the ninth speed driven gear 39b cooperatively operates according to the rotation of the seventh speed driving gear 37a, thus shifting to the ninth speed.

In this manner, since the ninth speed driven gear 39b and the seventh speed driven gear 37b are engaged together with respect to the seventh speed driving gear 37a, seventh speed and ninth speed gear shifting may be performed by the single seventh speed driving gear 37a, simplifying the components, whereby the compact layout may be effectively realized and the multiple speeds may be effectively performed.

A plurality of even-numbered gear-change gear trains 32, 34, 36, and 38 are installed between the second input shaft 12 and the first output shaft 21 and between the second input shaft 12 and the second output shaft 22. The plurality of even-numbered gear-change gear trains 32, 34, 36, and 38 include a second gear-change gear train 32, fourth gear-change gear train 34, sixth gear-change gear train 36, and eighth gear-change gear train 38, and thus, even-numbered gear shifting such as second speed, fourth speed, sixth speed, and eighth speed may be performed.

The even-numbered gear-change gear trains 32, 34, 36, and 38 include even-numbered speed driving gears 32a, 34a, and 36a installed in the second input shaft 12 and even-numbered speed driven gears 32b, 34b, 36b, and 38b installed in the first output shaft 21 or the second output shaft 22 and engaged with the even-numbered speed driving gears 32a, 34a, and 36a.

The even-numbered gear-change gear trains 32, 34, 36, and 38 will be described individually.

The second gear-change gear train 32 has the second speed driving gear 32a installed in the second input shaft 12 and the second speed driven gear 32b engaged with the second speed driving gear 32a. The second speed driven gear 32b is installed in the second output shaft 22. Thus, when power from a driving source is input to the second input shaft 12 according to coupling of the second clutch C2, the second speed driving gear 32a of the second input shaft 12 rotates and the second speed driven gear 32b cooperatively operates according to the rotation of the second speed driving gear 32a, thus shifting to the second speed.

The fourth gear-change gear train 34 has the fourth speed driving gear 34a installed in the second input shaft 12 and the fourth speed driven gear 34b engaged with the fourth speed driving gear 34*a*. The fourth speed driven gear 34*b* is installed in the first output shaft 21. Thus, when power from a driving source is input to the second input shaft 12 according to coupling of the second clutch C2, the fourth speed driving gear 34*a* of the second input shaft 12 rotates and the fourth speed driven gear 34*b* cooperatively operates according to the rotation of the fourth speed driving gear 34*a*, thus shifting to the fourth speed.

The sixth gear-change gear train 36 has the sixth speed driving gear 36*a* installed in the second input shaft 12 and the sixth speed driven gear 36*b* engaged with the sixth speed driving gear 36*a*. The sixth speed driven gear 36*b* is installed in the second output shaft 22. Thus, when power from a driving source is input to the second input shaft 12 according to coupling of the second clutch C2, the sixth speed driving gear 36*a* of the second input shaft 12 rotates and the sixth speed driven gear 36*b* cooperatively operates according to the rotation of the sixth speed driving gear 36*a*, thus shifting to the sixth speed.

The eighth gear-change gear train 38 has the eighth speed driven gear 38*b* installed in the first output shaft 21. The eighth speed driven gear 38*b* is disposed in an appropriate position on the opposite side of the sixth speed power driven gear 36*b* so as to be engaged with the sixth speed driving gear 36*a* of the sixth gear-change gear train 36. Thus, when power from a driving source is input to the second input shaft 12 according to coupling of the second clutch C2, the sixth speed driving gear 36*a* of the second input shaft 12 rotates and the eighth speed driven gear 38*b* cooperatively operates according to the rotation of the sixth speed driving gear 36*a*, thus shifting to the eighth speed.

In this manner, in the present disclosure, since the eighth speed driven gear 38*b* and the sixth speed driven gear 36*b* are engaged together with respect to the sixth speed driving gear 36*a*, sixth speed and eighth speed gear shifting are performed by the single sixth speed driving gear 36*a*, simplifying the components, whereby the compact layout may be effectively realized and the multiple speeds may be effectively performed.

In the present disclosure, a reverse gear device 80 is installed in at least one of the first and second output shafts 21 and 22. The reverse gear device 80 includes planetary gear sets 81, 82, 83, and 84 interlocked with the adjacent gear 32*b*.

The reverse gear device 80 includes a sun gear 81 rotating in the same direction together with any one driven gear 32*b* adjacent thereto, at least one planetary gear 82 engaged with the sun gear 81, a carrier 83 supporting the planetary gear 82, and a ring gear 84 engaged with the planetary gear 82.

According to an exemplary embodiment, the reverse gear device 80 is installed in the second output shaft 22, and in particular, the reverse gear device 80 is disposed between the second speed driven gear 32*b* and the sixth speed driven gear 36*b*. Since the sun gear 81 is installed in the second output shaft 22 and integrally connected to the second speed driven gear 32*b* installed in the second output shaft 22, the sun gear 81 rotates in the same direction as that of the second speed driven gear 32*b* cooperatively according to the rotation of the second speed driven gear 32*b*.

The carrier 83 is fixed to the transmission housing, or the like. A sixth/Rth speed synchronizer 44 is disposed between the reverse gear device 80 and the sixth gear-change gear train 36, and the ring gear 84 is coupled to or released from the second output shaft 22 by the sixth/Rth speed synchronizer 44.

An Rth speed gear shifting process by the reverse gear device 80 will be described.

When power is transmitted to the second input shaft 12 through the second clutch C2, the second speed driving gear 32*a* of the second input shaft 12 rotates in the same direction as that of the second input shaft 12, the second speed driven gear 32*b* is rotated by the second speed driving gear 32*a* in a direction opposite to that of the second input shaft 12, and the sun gear 81 rotates in a direction opposite to that of the second input shaft 12 according to the rotation of the second speed driven gear 32*b*. With the rotation of the sun gear 81, the planetary gear 82 rotates in a direction opposite to that of the sun gear 81 (that is, the planetary gear 82 rotates in the same direction as that of the second input shaft 12), and the ring gear 84 rotates in the same direction as that of the planetary gear 82 cooperatively according to the rotation of the planetary gear 82 (that is, the ring gear 84 rotates in the same direction as that of the second input shaft 12). Here, when the Rth speed coupling member 44*a* of the sixth/Rth speed synchronizer 44 couples the ring gear 84 to the second output shaft 22, the second output shaft 22 rotates in the same direction as that of the second input shaft 12 through the ring gear 84, and accordingly, the second final gear 52 of the second output shaft 22 reversely rotates the differential gear device 70, thus shifting to the Rth speed.

In this manner, in the present disclosure, since the reverse gear device 80 includes a planetary gear set, an idler gear may not be used unlike the related art multi-speed transmission, and thus, an overall length of the multi-speed transmission may be reduced, effectively realizing more compact layout.

Also, the synchronizers 41, 42, 43, 44, and 45 are installed between the aforementioned driven gears 32*b*, 33*b*, 34*b*, 35*b*, 36*b*, 37*b*, and 38*b* to selectively couple the driven gears 32*b*, 33*b*, 34*b*, 35*b*, 36*b*, 37*b*, and 38*b* to the first and second output shafts 21 and 22, thereby selectively performing gear shifting.

The synchronizers 41, 42, 43, 44, and 45 will be described in detail.

A second speed synchronizer 41 selectively coupling the second speed driven gear 32*b* to the second output shaft 22 is installed at one side of the second speed driven gear 32*b*. The second speed synchronizer 41 has a second speed coupling member 41*a* selectively coupling the second speed driven gear 32*b* to the second output shaft 22.

The third-ninth speed synchronizer 42 selectively coupling the third speed driven gear 33*b* and the ninth speed driven gear 39*b* to the first output shaft 21 is installed between the third speed driven gear 33*b* and the ninth speed driven gear 39*b*. The third-ninth speed synchronizer 42 has a third speed coupling member 42*a* selectively coupling the third speed driven gear 33*b* to the first output shaft 21 and a ninth speed coupling member 42*b* selectively coupling the ninth speed driven gear 39*b* to the first output shaft 21.

The fourth-eight speed synchronizer 43 selectively coupling the fourth speed driven gear 34*b* and the eighth speed driven gear 38*b* to the first output shaft 21 is installed between the fourth speed driven gear 34*b* and the eighth speed driven gear 38*b*. The fourth/eighth speed synchronizer 43 has a fourth speed coupling member 43*a* selectively coupling the fourth speed driven gear 34*b* to the first output shaft 21 and an eighth speed coupling member 43*b* selectively coupling the eighth speed driven gear 38*b* to the first output shaft 21.

The sixth/Rth speed synchronizer 44 selectively coupling sixth speed driven gear 36*b* and the ring gear 84 of the reverse gear device 80 to the second output shaft 22 is installed between the sixth speed driven gear 36*b* and the reverse gear device 80. The sixth/Rth speed synchronizer 44 has a sixth speed coupling member 44*a* selectively coupling the sixth speed driven gear 36*b* to the second output shaft 22 and an Rth speed coupling member 44*b* selectively coupling the ring gear 84 of the reverse gear device 80 to the second output shaft 22.

The fifth-seventh speed synchronizer 46 selectively coupling the fifth speed driven gear 35*b* and the seventh speed driven gear 37*b* to the second output shaft 22 is installed between the fifth speed driven gear 35*b* and the seventh speed driven gear 37*b*. The fifth-seventh speed synchronizer 46 has a fifth speed coupling member 46*a* selectively coupling the fifth speed driven gear 35*b* to the second output shaft 22 and a seventh speed coupling member 46*b* selectively coupling the seventh speed driven gear 37*b* to the second output shaft 22.

Meanwhile, the multi-speed transmission according to an exemplary embodiment of the present disclosure further includes a power transmission unit transmitting power received from the first input shaft 11 to the first output shaft 21 or the second output shaft 22 through the second input shaft or transmitting power received from the second input shaft 12 to the first output shaft 21 or the second output shaft 22 through the first input shaft 11.

The power transmission unit includes the synchronizer 45 for power transmission (or a power transmission synchronizer 45) installed between any one odd-numbered speed driven gear 33*b* and any one even-numbered speed driven gear 34*b* disposed to be adjacent to each other on the first output shaft 21 or the second output shaft 22. The power transmission synchronizer 45 is configured to selectively couple an odd-numbered speed driven gear 33*b* and an even-numbered speed driven gear 34*b* adjacent to each other.

Thus, the power transmission synchronizer 45 may transmit power transmitted from the first input shaft 11 to the even-numbered speed driven gear 34*b* adjacent thereto through the odd-numbered speed driven gear 33*b* or may transmit power transmitted from the second input shaft 12 to the odd-numbered speed driven gear 33*b* adjacent thereto through the even-numbered speed driven gear 34*b*.

Through the power transmission unit, the number of required components may be reduced, effectively realizing multiple speeds, while realizing a compact layout.

For example, as described above, in an exemplary embodiment of the present disclosure, a first gear-change gear train for shifting to the first and a tenth gear-change gear train for shifting to the tenth speed are not additionally provided, but shifting to the first speed and shifting to the tenth speed may be performed by the power transmission unit. That is, shifting to the first speed may be effectively performed through a gear ratio combination based on the one or more odd-numbered gear-change gear trains and one or more even-numbered gear-change gear trains by transmitting power transmitted from the first input shaft 11 to the second output shaft 22 through the second input shaft 12 by the power transmission unit, and also, shifting to the tenth speed may be effectively performed through a gear ratio combination of the one or more odd-numbered gear-change gear trains and one or more even-numbered gear-change gear trains by transmitting power transmitted from the second input shaft 12 to the first output shaft 21 through the first input shaft 11.

According to an exemplary embodiment, the power transmission synchronizer 45 installed between the third speed driven gear 33*b* and the fourth speed driven gear 34*b* and has a coupling member 45*a* for power transmission (or power transmission coupling member 45*a*) selectively coupling the fourth speed driven gear 34*b* and the third speed driven gear 33*b*.

Through this configuration, when the power transmission coupling member 45*a* of the power transmission synchronizer 45 is coupled to operate in a state in which turning force from the first input shaft 11 is transmitted to the third speed driven gear 33*b* of the third gear-change gear train 33, the fourth speed driven gear 34*b* and the third speed driven gear 33*b* are interlocked, the fourth speed driven gear 34*b* is rotated together with the third speed driven gear 33*b* in the same direction, the fourth speed driving gear 34*a* rotates cooperatively according to the rotation of the fourth speed driven gear 34*b*, and the second input shaft 12 is rotated by the fourth speed driving gear 34*a*. When any one driven gear 32*b*, 36*b*, or 37*b* provided in the second output shaft 22 is coupled by the synchronizers 41, 44, and 46 according to the rotation of the second input shaft 12, first speed gear shifting may be performed. For example, referring to the direction T1 of the arrows in FIG. 2, as the second speed driven gear 32*b* is coupled to the second output shaft 22 by the second/seventh speed synchronizer 41, a gear ratio R3 of the third gear-change gear train 33, a gear ratio R4 of the fourth gear-change gear train 34, and a gear ratio R2 of the second gear-change gear train gear-change gear train 32 are combined in the second output shaft 22, thus calculating a first speed gear ratio R1 corresponding to first speed gear shifting. That is, the first speed gear ratio R1 may be calculated through gear ratio combinations based on R1=(R3/R4)×R2.

Also, when the power transmission coupling member 45*a* of the power transmission synchronizer 45 is coupled to operate in a state in which turning force from the second input shaft 12 is transmitted to the fourth speed driven gear 34*b* of the fourth gear-change gear train 34, the fourth speed driven gear 34*b* and the third speed driven gear 33*b* are interlocked, the third speed driven gear 33*b* is rotated together with the fourth speed driven gear 34*b* in the same direction, the third speed driving gear 33*a* rotates cooperatively according to the rotation of the third speed driven gear 33*b*, and the first input shaft 11 is rotated by the third speed driving gear 33*a*. When any one driven gear 32*b*, 34*b*, 35*b*, 36*b*, or 37*b* provided in the first output shaft 21 is selectively coupled by the synchronizers 41, 44, and 46 according to the rotation of the first input shaft 11, tenth speed gear shifting may be performed. For example, referring to the direction T2 of the arrows in FIG. 2, as the seventh speed driven gear 37*b* is coupled to the second output shaft 22 by the fifth-seventh speed synchronizer 46, a gear ratio R3 of the third gear-change gear train 33, a gear ratio R4 of the fourth gear-change gear train 34, and a gear ratio R7 of the seventh gear-change gear train 37 are combined in the second output shaft 22, thus calculating a tenth speed gear ratio R10 corresponding to tenth speed gear shifting. That is, the tenth speed gear ratio R10 may be calculated by combining a gear ratio based on R10=(R4/R3)×R7.

Other components and operations are similar to or the same as the foregoing exemplary embodiments, so a detailed description thereof will be omitted.

According to the exemplary embodiments of the present disclosure, since the reverse gear device is configured as a planetary gear set, an overall length may be significantly reduced, compared with the existing multi-speed transmissions, realizing a compact layout, and also, since multiple speeds such as eight to ten speeds are effectively realized, fuel efficiency and shift quality may be considerably enhanced, increasing competitiveness.

The advantages and effects of the present disclosure are not limited to the aforementioned, and any other advantages and effects not described herein will be clearly understood by those skilled in the art from descriptions of claims.

The present disclosure described above may be variously substituted, altered, and modified by those skilled in the art to which the present disclosure pertains without departing from the scope and spirit of the present disclosure. Therefore, the present disclosure is not limited to the above-mentioned exemplary embodiments and the accompanying drawings.

What is claimed is:

1. A multi-speed transmission comprising:
a first input shaft configured to be rotatable;
a second input shaft configured to be rotatable coaxially with respect to the first input shaft;
first clutch and second clutch respectively transmitting power from a driving source to the first and second input shafts;
first output shaft and second output shaft configured to be parallel to the first and second input shafts;
a plurality of odd-numbered gear-change gear trains provided between the first input shaft and the first output shaft and between the first input shaft and the second output shaft;
a plurality of even-numbered gear-change gear trains provided between the second input shaft and the first output shaft and between the second input shaft and the second output shaft; and
a reverse gear device installed in at least any one of the first and second output shafts,
wherein the reverse gear device includes a sun gear rotating in a same direction together with an adjacent driven gear, at least one planetary gear engaged with the sun gear, a carrier configured to support the at least one planetary gear, and a ring gear engaged with the at least one planetary gear, and
wherein the carrier is fixed to a transmission housing, and the ring gear is configured to be coupled to or released from the output shaft in which the reverse gear device is installed, by a synchronizer.

2. The multi-speed transmission according to claim 1, wherein
the plurality of odd-numbered gear-change gear trains each include an odd-numbered speed driving gear provided in the first input shaft and an odd-numbered speed driven gear provided in the first output shaft or the second output shaft and engaged with the odd-numbered speed driving gear, and
the plurality of even-numbered gear-change gear trains each include an even-numbered speed driving gear installed in the second input shaft and an even-numbered speed driven gear installed in the first output shaft or the second output shaft and engaged with the even-numbered speed driving gear.

3. The multi-speed transmission according to claim 2, further comprising:
a power transmission unit configured to transmit power received from the first input shaft to the second output shaft through the second input shaft or transmit power received from the second input shaft to the first output shaft through the first input shaft.

4. The multi-speed transmission according to claim 3, wherein
the power transmission unit includes a power transmission synchronizer installed between the odd-numbered speed driven gear and the even-numbered speed driven gear disposed to be adjacent to each other on the first output shaft or the second output shaft, and
the power transmission synchronizer is configured to selectively couple the odd-numbered speed driven gear and the even-numbered speed driven gear disposed to be adjacent to each other.

5. The multi-speed transmission according to claim 4, wherein
the plurality of odd-numbered gear-change gear trains include a third gear-change gear train, a fifth gear-change gear train, and a seventh gear-change gear train, and
the plurality of even-numbered gear-change gear trains include a second gear-change gear train, a fourth gear-change gear train, a sixth gear-change gear train, and an eighth gear-change gear train.

6. The multi-speed transmission according to claim 5, wherein
the third gear-change gear train has a third speed driving gear installed in the first input shaft and a third speed driven gear engaged with the third speed driving gear,
the fifth gear-change gear train has a fifth speed driving gear installed in the first input shaft and a fifth speed driven gear engaged with the fifth speed driving gear,
the seventh gear-change gear train has a seventh speed driving gear installed in the first input shaft and a seventh speed driven gear engaged with the seventh speed driving gear,
the third speed driven gear and the fifth speed driven gear are installed in the first output shaft and the seventh speed driven gear is installed in the second output shaft,
the second gear-change gear train has a second speed driving gear installed in the second input shaft and a second speed driven gear engaged with the second speed driving gear,
the fourth gear-change gear train has a fourth speed driving gear installed in the second input shaft and a fourth speed driven gear engaged with the fourth speed driving gear,
the sixth gear-change gear train has a sixth speed driving gear installed in the second input shaft and a sixth speed driven gear engaged with the sixth speed driving gear,
the second speed driven gear and the sixth speed driven gear are installed in the second output shaft and the fourth speed driven gear is installed in the first output shaft, and
the eighth gear-change gear train includes an eighth speed driven gear installed in the first output shaft and the eighth speed driven gear is disposed to be engaged with the sixth speed driving gear.

7. The multi-speed transmission according to claim 6, wherein
a second/seventh speed synchronizer is installed between the second speed driven gear and the seventh speed driven gear to selectively couple the second speed driven gear and the seventh speed driven gear to the second output shaft.

8. The multi-speed transmission according to claim 6, wherein
the reverse gear device is disposed between the second speed driven gear and the sixth speed driven gear, the sun gear of the reverse gear device is connected to rotate in a same direction together with the second speed driven gear, and
a sixth/Rth speed synchronizer is installed between the sixth speed driven gear and the reverse gear device to selectively couple the sixth speed driven gear and the ring gear of the reverse gear device to the second output shaft.

9. The multi-speed transmission according to claim 6, wherein
a third/fifth speed synchronizer is installed between the third speed driven gear and the fifth speed driven gear to selectively couple the third speed driven gear and the fifth speed driven gear to the first output shaft.

10. The multi-speed transmission according to claim 6, wherein
a fourth/eighth speed synchronizer is installed between the fourth speed driven gear and the eighth speed driven gear to selectively couple the fourth speed driven gear and the eighth speed driven gear to the first output shaft.

11. The multi-speed transmission according to claim 6, wherein
the power transmission synchronizer is installed between the third speed driven gear and the fourth speed driven gear, and
the power transmission synchronizer is configured to selectively couple the fourth speed driven gear and the third speed driven gear.

12. The multi-speed transmission according to claim 4, wherein
the plurality of odd-numbered gear-change gear trains include a third gear-change gear train, a fifth gear-change gear train, a seventh gear-change gear train, and a ninth gear-change gear train,
the plurality of even-numbered gear-change gear trains include a second gear-change gear train, a fourth gear-change gear train, a sixth gear-change gear train, and an eighth gear-change gear train.

13. The multi-speed transmission according to claim 12, wherein
the third gear-change gear train has a third speed driving gear installed in the first input shaft and a third speed driven gear engaged with the third speed driving gear,
the fifth gear-change gear train has a fifth speed driving gear installed in the first input shaft and a fifth speed driven gear engaged with the fifth speed driving gear,
the seventh gear-change gear train has a seventh speed driving gear installed in the first input shaft and a seventh speed driven gear engaged with the seventh speed driving gear,
the third speed driven gear is installed in the second output shaft and the fifth speed driven gear and the seventh speed driven gear are installed in the first output shaft,
the ninth gear-change gear train has a ninth speed driving gear installed in the second input shaft and the ninth speed driven gear is disposed to be engaged with the seventh speed driving gear,
the second gear-change gear train has a second speed driving gear installed in the second input shaft and a second speed driven gear engaged with the second speed driving gear,
the fourth gear-change gear train has a fourth speed driving gear installed in the second input shaft and a fourth speed driven gear engaged with the fourth speed driving gear,
the sixth gear-change gear train has a sixth speed driving gear installed in the second input shaft and a sixth speed driven gear engaged with the sixth speed driving gear,
the second speed driven gear and the sixth speed driven gear are installed in the second output shaft and the fourth speed driven gear is installed in the first output shaft, and
the eighth gear-change gear train includes an eighth speed driven gear installed in the first output shaft and the eighth speed driven gear is disposed to be engaged with the sixth speed driving gear.

14. The multi-speed transmission according to claim 13, wherein
a second speed synchronizer is installed at a side of the second speed driven gear to selectively couple the second speed driven gear to the second output shaft.

15. The multi-speed transmission according to claim 13, wherein
the reverse gear device is disposed between the second speed driven gear and the sixth speed driven gear, the sun gear of the reverse gear device is connected to rotate in a same direction together with the second speed driven gear, and
a sixth/Rth speed synchronizer is installed between the sixth speed driven gear and the reverse gear device to selectively couple the sixth speed driven gear and the ring gear of the reverse gear device to the second output shaft.

16. The multi-speed transmission according to claim 13, wherein
a third-ninth speed synchronizer is installed between the third speed driven gear and the ninth speed driven gear to selectively couple the third speed driven gear and the ninth speed driven gear to the first output shaft.

17. The multi-speed transmission according to claim 13, wherein
a fourth/eighth speed synchronizer is installed between the fourth speed driven gear and the eighth speed driven gear to selectively couple the fourth speed driven gear and the eighth speed driven gear to the first output shaft.

18. The multi-speed transmission according to claim 13, wherein
a fifth-seventh speed synchronizer is installed between the fifth speed driven gear and the seventh speed driven gear to selectively couple the fifth speed driven gear and the seventh speed driven gear to the second output shaft.

19. The multi-speed transmission according to claim 13, wherein
the power transmission synchronizer is installed between the third speed driven gear and the fourth speed driven gear, and
the power transmission synchronizer is configured to selectively couple the fourth speed driven gear and the third speed driven gear.

* * * * *